Feb. 24, 1970 W. J. SMITH 3,497,695
RADIANT ENERGY TRANSMITTING DEVICE
Filed Dec. 11, 1961 2 Sheets-Sheet 1

INVENTOR
WARREN J. SMITH
BY [signature]
AGENT

Feb. 24, 1970 W. J. SMITH 3,497,695

RADIANT ENERGY TRANSMITTING DEVICE

Filed Dec. 11, 1961 2 Sheets-Sheet 2

INVENTOR
WARREN J. SMITH
BY
AGENT

United States Patent Office 3,497,695

Patented Feb. 24, 1970

3,497,695

RADIANT ENERGY TRANSMITTING DEVICE

Warren J. Smith, Santa Barbara, Calif., assignor to Raytheon Company, Lexington, Mass., a corporation of Delaware Filed Dec. 11, 1961, Ser. No. 160,395
Int. Cl. G02b *5/16;* G01d *5/36;* G01b *15/00*
U.S. Cl. 250—203 13 Claims This invention relates to radiant energy devices such as tracking or position detecting devices and has particular reference to improved systems for directing a beam of radiant energy onto an energy responsive device such as a detector.

Most specifically, the invention is concerned with radiant energy systems for trackers or the like which contain means within the systems for reducing deleterious effects caused by nonuniform detector sensitivity, atmospheric shimmer, or other transmission degradation. Such means, in accordance with this invention, comprises the insertion of energy diffusing elements at strategic locations in the system for the purpose of diffusing the radiant energy beam to reduce the concentration of rays of radiant energy which provide undesirable effects caused by atmospheric perturbations and to illuminate substantially the entire scanned area of the detector, without reducing the basic effectiveness of the tracker.

The invention is described herein as applied to a radiant energy tracker which receives a beam of radiant energy from a target and utilizes on- or off-axis conditions of the beam with respect to the device for maintaining the target and device in axial alignment. However, the invention is applicable to other devices such as position detecting devices for following the movements of astronomical bodies, or other devices sensitive to radiant energy.

One form of tracker of the presently described type generates a tracking signal by moving a partially opaque reticle past a defocused image of the modulated energy source being tracked. Spurious modulation of the tracking signal may result from the presence of variations of sensitivity across the surface of the energy detector and/or variations of transmission across the energy beam from the source, such as caused by atmospheric pertubations known as shimmer.

In the operation of such a tracker, energy from the tracked source is imaged at the focus of an objective and is transmitted thereby to form a "blur spot" in the plane of the rotating reticle. If the blur spot is coaxial with the reticle center of rotation, the area of the blur spot intercepted by the reticle is unchanged as the reticle is rotated. However, if the source is off the tracker axis, its image creates a blur spot which is not centered on the reticle and the area intercepted by the reticle varies as the reticle rotates. The image passing from the reticle to the detector in the latter case is modulated, and the amount of modulation is a measure of the displacement of the image from the axis, and the phase of the modulation relative to the reticle is a measure of the direction of the displacement.

When a spatial variation of transmission exists in the energy beam from the tracked source, such as may be caused by shimmer or by an obscuration, it results in nonuniform illumination of the blur spot at the reticle plane, and the modulation of the energy passed by the reticle is modified, resulting in an erroneous tracking signal. For example, if the blur spot is exactly on axis, the reticle will rotate about the center of the blur spot, but since the blur spot is not uniformly illuminated, because of the shadow of the obscuration, the energy passing it will vary as the reticle rotate to intercept different half-areas of the spot, thus generating a false modulation.

Similarly, when the reticle shadow rotates over the detector surface, a spatially nonuniform sensitivity of the detector will also generate spurious signals. Using the "on-axis" example of the preceding paragraph, although the same energy falls on the detector for all positions of the reticle, assuring no transmission variations, the response of the detector to the energy will be different for different portions of the detector, and a spurious signal will result.

It can be seen that these difficulties arise from the fact that in the case of transmission variations the blur spot has a point-for-point relationship or conjugacy with the cross section of the energy beam and in the case of detector sensitivity variation the blur spot has a similar conjugacy with the illuminated area of the detector.

One of the primary objects of this invention is to provide an improved radiant energy device wherein the correlation or conjugacy between the blur spot of the beam section or detector surface is reduced by the introduction of an energy diffusing element at a predetermined location in the system for scrambling the relationships without destroying the utility of the device.

Another object is to provide a system of the above character wherein an energy diffusing element is located at the focus of the system for producing a darkened ring-like shadow of an obscuration at the blur spot.

Another object is to provide a system of the above character wherein an energy diffusing element is located between the detector and the rotating reticle to substantially uniformly illuminate the scanned area of the detector whereby sensitivity variations within the area introduce no spurious signals.

Other objects and advantages of the invention will become apparent from the following description taken in connection with the accompanying drawings, wherein.

Figures 1, 2:
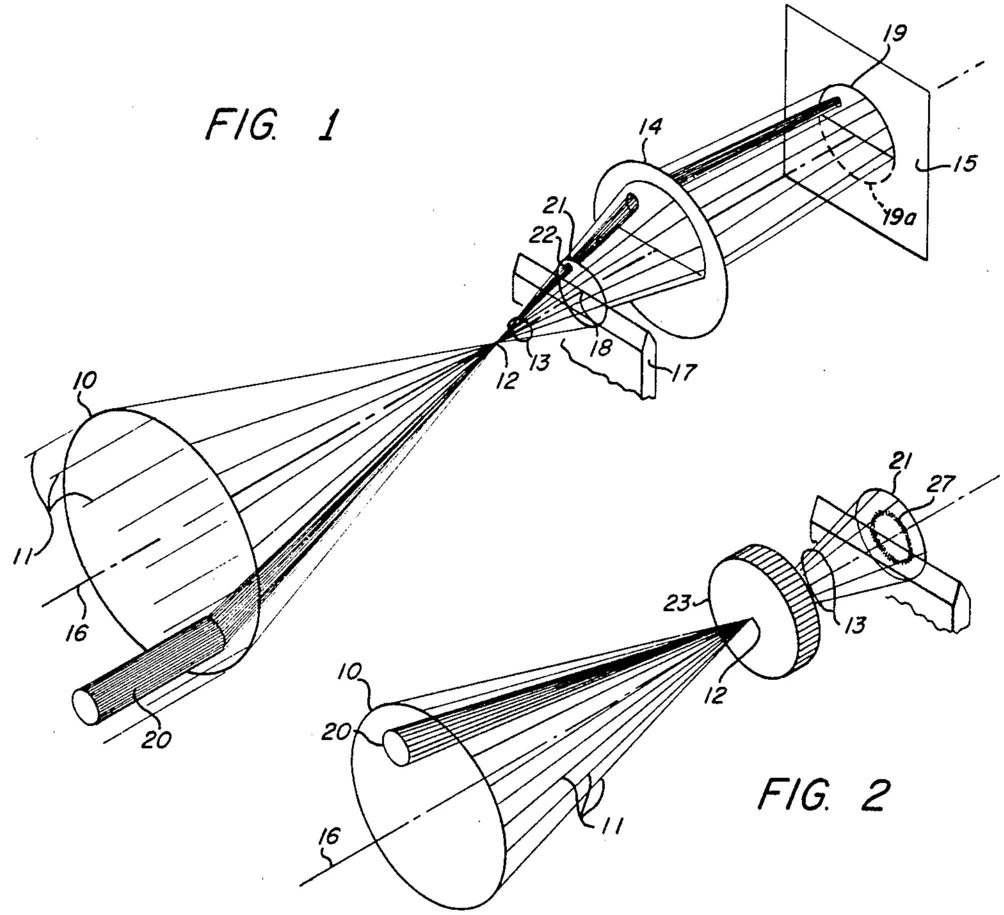
FIG. 1 is a schematic diagram illustrating an optical system for a radiant energy tracking device.
FIG. 2 is a diagram of a portion of the optical system of FIG. 1 showing a fiber optic energy diffusing element introduced to reduce the effect of atmospheric perturbations.

Referring more particularly to the drawings wherein like characters of reference designate like parts throughout the several views, the system of FIG. 1 includes an objective lens 10 which collects energy, shown as rays 11, from a source and focuses this energy as a beam upon a crossover or focal point 12 lying in a given focal plane. Beyond focal point 12 the rays diverge to form an image cone 13 directed toward a field lens 14 which in turn projects the energy onto a detector 15 which is sensitive to the radiant energy. The energy rays 11 may be in either the visible, infrared, ultraviolet, microwave, or other spectrum which may be properly refracted or reflected by the lenses of the system. The entire system is located on a known longitudinal axis 16 which passes in a straight line through substantially the optical axes of the lenses 10 and 14.

Between focal point 12 and field lens 14 is a reticle 17 which is rotatable about a center 18 which lies on axis 16. Reticle 17 may be formed of respective opaque and transparent portions extending radially of axis 16, and in the illustrated embodiment is shown as a platelike member having a straight knife edge which extends through center 18. Thus, reticle 17 cuts off a portion of the bundle 13 of rays which fall upon it, the size of the portion being dependent upon the shape of the reticle, and only the remaining portion of the rays are transmitted to the field lens 14 and thence to detector 15. In the example shown in FIG. 1, one-half the beam falls upon the detector 15 and illuminates a semicircular area 19 thereof.

The reticle thus chops or obstructs the image of the target and produces a signal, which in this case is an optical signal, having an unmodulated fundamental frequency when a target is located on the optical axis 16. The signal, however, has frequency modulation of this fundamental frequency when a target is located off the axis 16. The amount of modulation is a measure of the displacement of the image in the plane of the reticle from axis 16 and the phase of the modulation relative to the reticle is a measure of the direction of the displacement. The optical signal thus reaching the detector is modulated or unmodulated, as the case may be, and falls upon the detector surface as a semicircular image 19 which revolves around axis 16 as the reticle 17 rotates. The optical signal impressed on the detector is converted to an electrical signal which is adapted to operate control means (not shown) well known in the art to maintain the axis 16 of the tracker in proper alignment with the target.

It has been found that variations of transmission sometimes occur in the energy beam 11, such as those caused by atmospheric perturbations known as "shimmer." For example, an obscuration, indicated as a shadow 20 in FIG. 1, falling upon objective lens 10 will be transmitted through the system in the same manner as normal energy rays. The beam 13 of rays transmitted by lens 10 forms an unfocused image or "blur spot" 21 in the plane of the reticle 17, which plane hereafter is called an "image plane," which blur spot contains a shadow image 22 of the obscuration. Regardless of whether or not the blur spot is on axis or off axis, depending upon alignment of axis 16 with the target, the spot image 22 will be alternately intercepted by the opaque and transparent portions of the reticle. Such nonuniform illumination of the blur spot in the image plane, which nonuniformity is caused by the obscuration, modifies the energy passed by the reticle resulting in an erroneous tracking signal. For example, if the blur spot is exactly on axis 16, the reticle will rotate about the center of the blur spot, but since the blur spot is not uniformly illuminated the energy passing it will vary as the reticle rotates to intercept different half areas of the spot, thus generating a false modulation.

In accordance with this invention, the shadow or image of the obscuration is eliminated by scattering or diffusing the rays from the image so that they uniformly illuminate the blur spot. This is accomplished by inserting substantially at focal point 12 a diffusing element such as optical element 23 comprised of a bundle of energy transmitting fibers arranged on the axis 16 so as to transmit the energy longitudinally therethrough as shown in FIG. 2. Element 23 may be formed in any known manner so as to embody a multiplicity of energy transparent fibers in a bundle in which the fibers extend parallel to one another in the general direction of the length of the bundle and are in compact relation so that the fibers throughout the bundle are in longitudinal contact, thus forming a unitary body or element which, in effect, is a continuous transparent body having a multiplicity of very small, straight, energy transmitting passages extending in parallelism therethrough.

Figure 4:
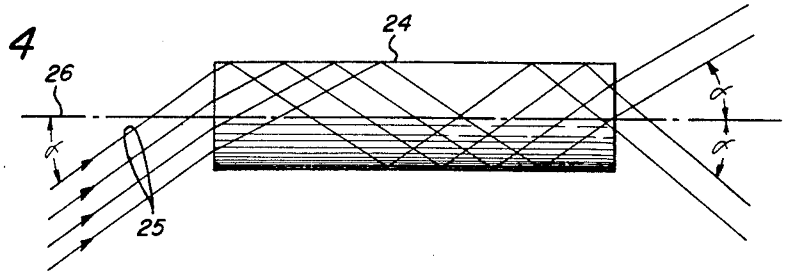
FIG. 4 is a diagrammatic illustration of light rays passing through an optical fiber.

Element 23 functions to diffuse or scatter the rays containing the image of the obscuration, as pointed out above, and this is achieved as shown in FIG. 4 wherein there is shown a greatly enlarged view of a single fiber 24. Fiber 24 is a very thin cylinder of material transparent to the radiant energy, typically glass, which transmits energy along its length and contains the energy within itself by means of total internal reflections at is cylindrical surface. A group or fan 25 of rays entering one end of the fiber at an angle $\alpha$ to the fiber axis 26 is reflected along the length of the fiber and emerges at the same angle $\alpha$ to the axis. However, the radial orientation of this angle about the axis is a function of the position at which a given ray strikes the entrance face of the fiber. A three-dimensional analysis shows that the bundle of rays is broken up by the fiber and emerges as a hollow cone of rays with apex angle $2\alpha$.

Referring again to FIG. 2, there is shown the effect produced in the system of FIG. 1 when a fiber optic diffusing element 23 is placed with its entrance face at focal point 12. The focal point is transmitted along axis 16 throughout the length of the element 23 and the energy rays 11 emerge as cone 13 having its apex on the exit face of element 23. The image 20 of the obscuration is present in cone 13 as a darkened ring 27 (FIG. 2) instead of the shadow spot 22 (FIG. 1). This produces variations in intensity or illumination of the energy at blur spot 21 which, however, appear as a continuous ring 27. Since such variations at the blur spot are concentric, no spurious modulation is introduced when the image or blur spot is concentric with axis 16. While the improvement for "off axis" conditions is not as great, it is still substantial and effective.

The problem of spatially nonuniform sensitivity of the detector 15, resulting in generation of spurious signals, is overcome by elimination of the reticle shadow 19*a* at the detector 15. As seen in FIG. 1, the reticle cuts off half of the radiant energy in the bundle of rays 13, and this causes the formation of a semicircular image 19 which rotate through the "image plane" defined by the surface of detector 15 as the reticle revolves. Thus, any area of nonuniform sensitivity of the detector surface will be alternately illuminated and darkened, causing spurious signals even when the blur spot 21 is aligned concentrically with axis 16.

Figure 3:
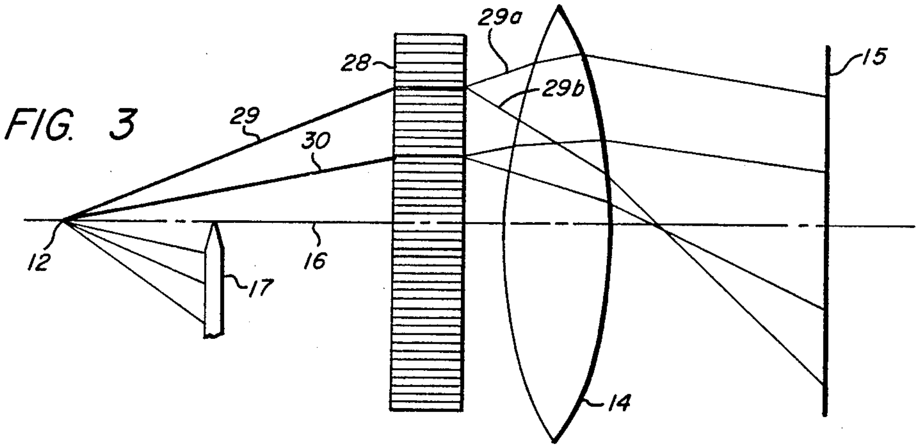
FIG. 3 is a diagram of a portion of the optical system of FIG. 1 showing a fiber optic energy diffusing element introduced to reduce the effect of variations in sensitivity of the detector surface.

In accordance with this invention, the semicircular reticle shadow 19*a* at the detector is eliminated by inserting a diffusing element 28 between the reticle 17 and field lens 14, as shown in FIG. 3. Element 28 is concentric with axis 16 and may be constructed similarly to element 23. A semicircular bundle of rays will illuminate one side of element 28 and will pass longitudinally therethrough along the fibers. When the rays emerge from the opposite surface of the element, they will be modified as described in connection with FIG. 4.

For example, a beam of energy enters element 28 as a single closely combined group of rays indicated by a heavy line 29 in FIG. 3. The beam emerges, however, as a hollow cone of rays, indicated by lines 29*a* and 29*b*, which is focused onto the detector 15 by lens 14 as a circular area of illumination. The lens shape and the spacing between the lens and detector may be controlled so as to locate the area of illumination concentric with axis 16. Likewise, a beam 30 entering element 28 at an angle with respect to axis 16 which is smaller than the angle of beam 29 will emerge as a cone of illumination which has a smaller diameter than the cone from beam 29.

Therefore, it will be understood that although only half of the radiant energy entering the system eventually reaches the detector after being intercepted by reticle 17, the detector will nevertheless be impinged by a circular area of illumination at all times, instead of the semicircular area of prior art systems. As the reticle 17 rotates, the conditions of illumination, at least for "on axis" images, are completely stable, and variations in sensitivity across the detector surface will introduce no spurious signals. Again, "off axis" conditions will not produce the same degree of improvement, but the improvement will still be substantial and effective.

Figures 5, 6:
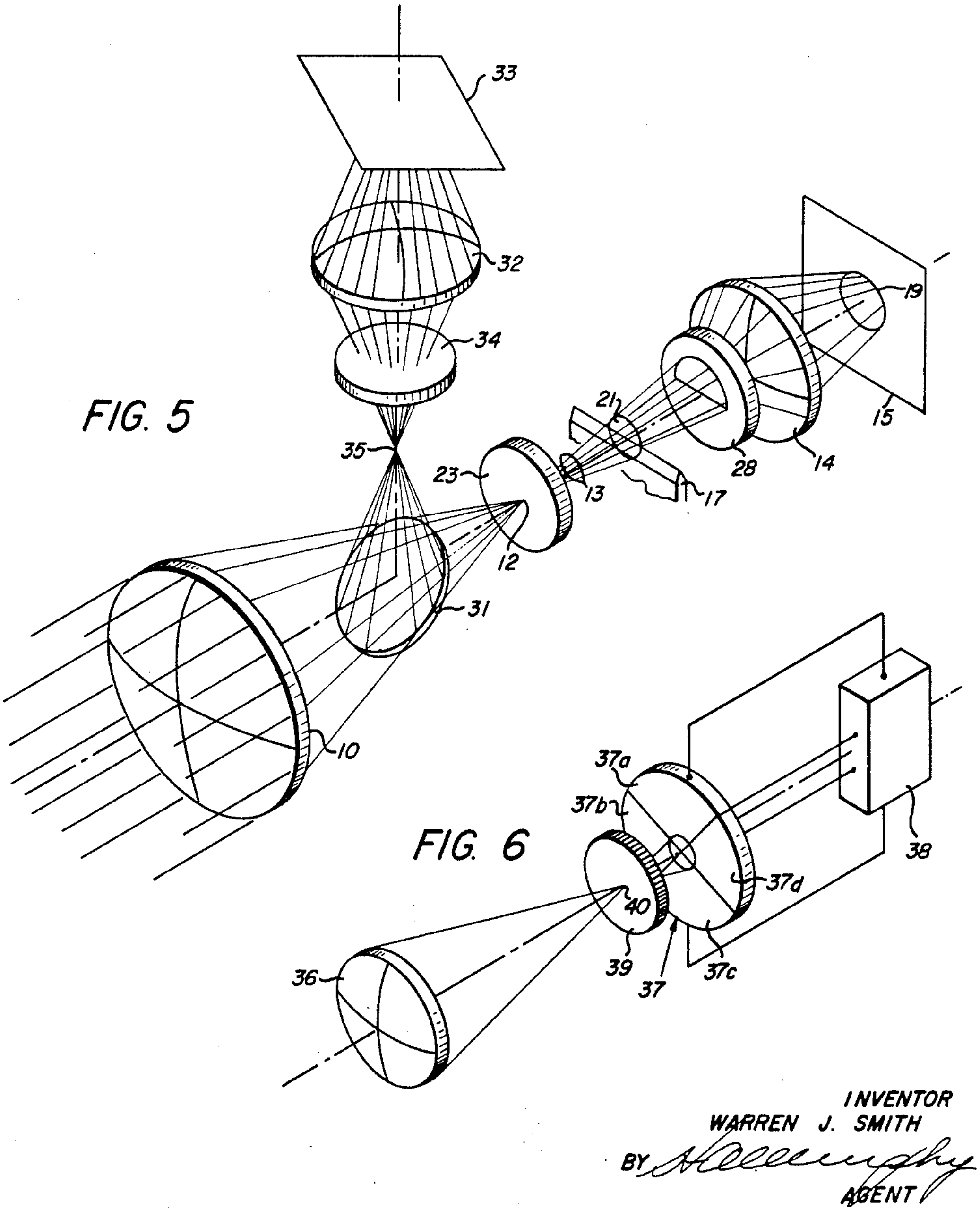
FIG. 5 is a schematic diagram of an optical system embodying several fiber optic energy diffusing elements.
FIG. 6 is a diagram of a modified device utilizing an energy diffusing element according to the invention.

Referring to FIG. 5, there is shown a system embodying the improvements described above, and further including a semireflector 31 which is inserted in the system between objective lens 10 and focal point 12. This semireflector 31 is preferably aligned concentrically with axis 16 and inclined as shown to direct a portion of the radiant energy through a respective field lens 32 toward a second detector 33. The purpose of the second detector 33 is to monitor the strength of the radiation from the target and eliminate the effect of variations in this strength from the incoming signal. However, since such radiation may contain undesirable variations, a diffusing element 34 is located in the path of radiation between lens 32 and focal point 35 to eliminate the effect of such variations.

Another modification of the tracking or position detecting device is depicted in FIG. 6 and comprises a lens 36 for focusing radiant energy onto an energy sensitive detector 37 which is arranged with a number of operatively separate detecting surfaces. The illustrated device has four quadrants, 37*a*, 37*b*, 37*c* and 37*d*, each of which is independently electrically connected to control mechanism 38 which functions in a manner well known in the art to adjust the system in accordance with illumination of one or more of the quadrants by the beam of radiant energy. When all quadrants are equally illuminated, no adjustment is necessary since this indicates an on-axis condition. However, when one or more of the quadrants is illuminated to a greater or lesser extent than other quadrants, this indicates an off-axis condition and mechanism 38 will operate to adjust the device until on-axis conditions are obtained.

Here again it will be apparent that when a spatial variation of transmission exists in the energy beam impinging upon the detector 37 it produces nonuniform illumination through the illuminated area, resulting in erroneous signals being transmitted to the control mechanism 38. This fault is overcome by a diffusing element 39 which is positioned with its entrance surface substantially at the focal point 40 similarly to the structure of FIG. 2. Thus, the beam to the detector 37 is diffused and the image of the nonuniform energy is equally distributed throughout the illuminated areas, resulting in accurate signals.

It will be apparent from the foregoing that improved systems have been provided wherein generations of spurious signals resulting from obscuration in the beam or at the objective lens, from atmospheric perturbations, or from variations in detector sensitivity are overcome or reduced without affecting the normal operation of devices of this character. Although the optical systems shown and described include a radiant energy transparent objective lens 10 for directing the radiant energy toward the energy sensitive detector 15, modifications of the system could be utilized such as the incorporation in the system of a reflecting element to be substituted for the objective lens 10. The systems may, of course, be further modified by the provision of means such as a revolving prism for rotating the beam of radiant energy as described in U.S. Patent No. 3,002,098, Watkins, dated Sept. 26, 1961, assigned to Raytheon Company.

It is to be further understood that various other modifications and changes may be made by those skilled in the art without departing from the spirit of the accompanying claims. Therefore, all matter shown and described is to be considered as illustrative and not in a limiting sense.

I claim:

1. A radiant energy system comprising a converging lens system for focusing a beam of radiant energy through a focal point of the lens system, an image plane on the opposite side of the focal point for receiving said energy beam after it passes through the focal point, and means at said focal point and transparent to said energy beam for intercepting and diffusing the energy transmitted to said image plane, said means comprising a diffusing element comprised of a multiplicity of parallel transparent fibers disposed to receive said energy beam at one end thereof and emit the beam in diffused form from the opposite end thereof toward said image plane whereby an image of an obscuration in said beam will be converted to an annular configuration at said image plane.

2. In an energy transmitting system having a converging lens system for focusing a beam of radiant energy along an axis through the focal point of the lens system to an image plane, and means transparent to the beam of radiant energy located at said focal point for diffusing the beam transmitted to the image plane, said means being a disc-like fiber optic element having its longitudinal axis substantially parallel to the axis of the system and having its entrance surface located substantially at said focal point whereby an image of an obscuration in said beam will be converted to an annular configuration at said image plane.

3. In a radiant energy apparatus, an energy transmitting device comprising means for focusing a beam of radiant energy along an axis and through a focal point, an image plane on the opposite side of the focal point for receiving said beam after it passes through the focal point, a detector sensitive to radiant energy positioned to receive said energy beam after it passes through said image plane, movable reticle means in said image plane and rotatable about a center concentric with said axis for intercepting a portion of said beam and scanning the remainder of the beam sequentially over a selected area of the detector, and means for reducing the effects of nonuniform sensitivity in said selected area of the detector comprising diffusing means located at the focal point for intercepting and diffusing the portion of the beam transmitted to the detector whereby the detector will be illuminated through the selected area, including the area of nonuniform sensitivity.

4. In a radiant energy device, energy transmitting means comprising a converging lens system for focusing a radiant energy beam through the focal point of the lens system, an image plane on the opposite side of the focal point for receiving said energy beam after it passes through the focal point, and means for reducing the effects of atmospheric perturbations causing variations in transmission across the energy beam comprising a diffusing element at said focal point and transparent to said energy beam for intercepting and diffusing the beam transmitted to said means comprising a bundle of parallel transparent fibers disposed to receive said energy beam at one end thereof and emit the beam in diffused form from the opposite end thereof toward said image plane whereby images of said perturbations in the energy beam are converted to an annular configuration at said image plane.

5. In a radiant energy device, energy transmitting means comprising a converging lens system for focusing a radiant energy beam through the focal point of the lens system, a first image plane on the opposite side of the focal point for receiving said energy beam after it passes through the focal point, a second image plane positioned to receive said beam after it passes through said first image plane, a lens system between the first and second image planes for focusing the energy onto the second image plane, a reticle rotatable in said first image plane, and means transparent to radiant energy located at said focal point for intercepting and diffusing the energy transmitted to said second image plane, said means being separate from said reticle and fixed with respect thereto.

6. Means substantially as set forth in claim 5 wherein the means transparent to radiant energy comprises a diffusing element comprised of a multiplicity of parallel fibers disposed to receive said radiant energy at one end thereof and emit said energy in diffused form from the opposite end thereof toward said selected image plane.

7. An energy transmitting system for a radiant energy device, comprising a converging lens system for focusing a beam of radiant energy through the focal point of the lens system, an image plane on the opposite side of the focal point for receiving said energy beam after it passes through the focal point, a radiant energy sensitive detector positioned to receive said energy beam after it passes through said image plane, rotatable reticle means in said image plane for blocking a portion of said energy beam and operable to cause the remaining portion of the beam to scan the detector, and means transparent to radiant energy and positioned at said focal point for intercepting and diffusing the energy beam transmitted to said detector, said means being separate from said reticle and fixed with respect thereto.

8. A system substantially as set forth in claim 7 wherein the means transparent to radiant energy comprises a diffusing element comprised of a bundle of parallel fibers transparent to the energy having one end positioned at said focal point and disposed to receive said energy beam at said one end thereof and emit said beam in diffused form from the opposite end thereof toward the detector.

9. An energy transmitting system for a radiant energy device, comprising means for receiving radiant energy along an axis and focusing a beam of said energy through a focal point toward a detector sensitive to said energy, a reticle positioned in a known image plane between the focal point and the detector for intercepting a portion of said energy beam and rotatable about a center concentric with said axis to cause the remaining portion of the beam to sequentially scan a selected area of the detector, first diffusing means at said focal point for intercepting and diffusing the energy beam passing through the focal point, and second diffusing means between the reticle and detector for intercepting and diffusing the portion of the energy beam passing by the reticle whereby the scanned area of the detector will be uniformly illuminated throughout.

10. A system substantially as set forth in claim 9 wherein a field lens is located between the detector and said second diffusing means for directing the diffused beam onto said selected area of the detector.

11. A system substantially as set forth in claim 9 wherein said first and second diffusing means each comprises a diffusing element comprised of a multiplicity of parallel fibers transparent to the energy and disposed to receive said energy beam at one end thereof and emit the beam in diffused form from the opposite end thereof.

12. A system substantially as set forth in claim 11 wherein a field lens is located between the detector and said second diffusing means, and said second diffusing means is a disk-like fiber optic member substantially axially aligned with the field lens and the first diffusing means.

13. A system substantially as set forth in claim 11 wherein the element at the focal point is a disk-like fiber optic member having its entrance surface located coincident with said focal point.

References Cited

UNITED STATES PATENTS

| | | | |
|---|---|---|---|
| 942,589 | 12/1909 | Salsbury | 350—96 |
| 1,687,119 | 10/1928 | Benson et al. | 350—96 |
| 2,877,368 | 3/1959 | Sheldon | 350—96 |
| 2,961,545 | 11/1960 | Astheimer et al. | 250—203 |
| 3,001,437 | 9/1961 | Taylor | 350—285 |
| 3,033,071 | 5/1962 | Hicks | 350—96 |

FOREIGN PATENTS

| | | |
|---|---|---|
| 800,303 | 8/1958 | Great Britain. |

RICHARD A. FARLEY, Primary Examiner

D. C. KAUFMAN, Assistant Examiner

U.S. Cl. X.R.

250—209, 233; 350—96